US006954481B1

(12) United States Patent
Laroia et al.

(10) Patent No.: US 6,954,481 B1
(45) Date of Patent: Oct. 11, 2005

(54) PILOT USE IN ORTHOGONAL FREQUENCY DIVISION MULTIPLEXING BASED SPREAD SPECTRUM MULTIPLE ACCESS SYSTEMS

(75) Inventors: Rajiv Laroia, Basking Ridge, NJ (US); Junyi Li, Matawan, NJ (US); Sathyadev Venkata Uppala, Scotch Plains, NJ (US)

(73) Assignee: Flarion Technologies, Inc., Bedminster, NJ (US)

( * ) Notice: Subject to any disclaimer, the term of this patent is extended or adjusted under 35 U.S.C. 154(b) by 0 days.

(21) Appl. No.: 09/551,791

(22) Filed: Apr. 18, 2000

(51) Int. Cl.$^7$ ............................................... H04B 1/713

(52) U.S. Cl. .................................................... 375/132

(58) Field of Search ..................... 375/130, 132, 375/133, 136

(56) References Cited

U.S. PATENT DOCUMENTS

| | | | | |
|---|---|---|---|---|
| 5,867,478 A | * | 2/1999 | Baum et al. | 370/203 |
| 6,018,317 A | * | 1/2000 | Dogan et al. | 342/378 |
| 6,473,418 B1 | * | 10/2002 | Laroia et al. | 370/344 |
| 2001/0043578 A1 | * | 11/2001 | Kumar et al. | 370/331 |

OTHER PUBLICATIONS

EPC Search Report for European Application No. 0130339.4, Sep. 4, 2001.
Tufvesson et al: "Pilot Assisted Channel Estimation for OFDM in Mobile Cellular Systems", 1997 IEEE 47$^{th}$ Vehicular Technology Conference, New York, vol. 3, Conf. 4,May 4, 1997, pp. 1639–1643.
U. Reimers: "Digital Video Broadcasting", IEEE Communications Magazine, IEEE Service Center, Piscataway, NJ, U.S.A., vol. 36 No.6, Jun. 1, 1998, pp. 104–110.
Fernandez–Getino Garcia J et al.: "Efficient Pilot Patterns for Channel Estimation on OFDM Systems Over HF Channels", VTC 1999–Fall, IEEE VTS 50$^{th}$ Vehicular Technology Conference, Gateway to the 21$^{st}$, Century Communications Village, Amsterdam, Sep. 19–22, 1999, IEEE Vehicular Technology Conference, New York, NY, U.S.A., vol. 4, Conf 50, Sep. 19, 1999, pp. 2193–2197.

Han D S et al: "On the Synchronization of MC–CDMA System for Indoor Wireless Communications", VTC 1999–Fall, IEEE VTS 50$^{th}$, Vehicular Technology Conference; Gateway to the 21$^{st}$ Century Communications Village, Amsterdam, Sep. 19–22, 1999, IEEE Vehicular Technology Conference, New York, NY, U.S.A, vol. 2, Conf. 50, Sep. 1999, pp. 693–697.

(Continued)

*Primary Examiner*—Kevin Burd
(74) *Attorney, Agent, or Firm*—Michael P. Straub; Straub & Pokotylo

(57) ABSTRACT

Base station identification and downlink synchronization are realized by employing pilots including known symbols transmitted at prescribed frequency tones in individual ones of prescribed time intervals. Specifically, the symbols used in the pilots are uniquely located in a time-frequency grid, where the locations are specified by periodic pilot tone hopping sequences. In a specific embodiment of the invention, a period of a pilot tone hopping sequence is constructed by starting with a Latin-square based hopping sequence, truncating it over time, and possibly offsetting and permuting it over frequency. Particular examples of pilot tone hopping sequences are parallel slope hopping sequences in which the periodicity of the sequences is chosen to be a prime number of symbol time intervals. In another embodiment of the invention, a notion of phantom pilots is employed to facilitate use of various system parameters while accommodating the above noted pilot tone hopping sequences.

34 Claims, 4 Drawing Sheets

OTHER PUBLICATIONS

Fazel K et al: "A Flexible and High Performance Cellular Mobile Communications System Based on Orthogonal Multi-Carrier SSMA", Wireless Personal Communications, Kluwer Academic Publishers, NL, vol. 2, No. ½, 1995, pp. 121–144.

Wang C C et al: "Dynamic Channel Resource Allocation in Frequency Hopped Wireless Communication Systems", Information Theory, 1994. Proceedings, 1994 IEEE International Symposium on Trondheim, Norway 27, Jun. 1, Jul. 1994, New York, NY, U.S.A., IEEE, Jun. 27, 1994, p. 229.

F. Tufvesson et al., "Pilot Assisted Estimation for OFDM, In Mobile Cellular Systems", *IEEE*, 0–7803–3659–3/97, pp. 1639–1643.

R. Negi et al., "Pilot Tone Selection for Channel Estimation in a Mobile OFDM System", *IEEE Transactions on Consumer Electronics*, pp. 1122–1128, 1998.

\* cited by examiner

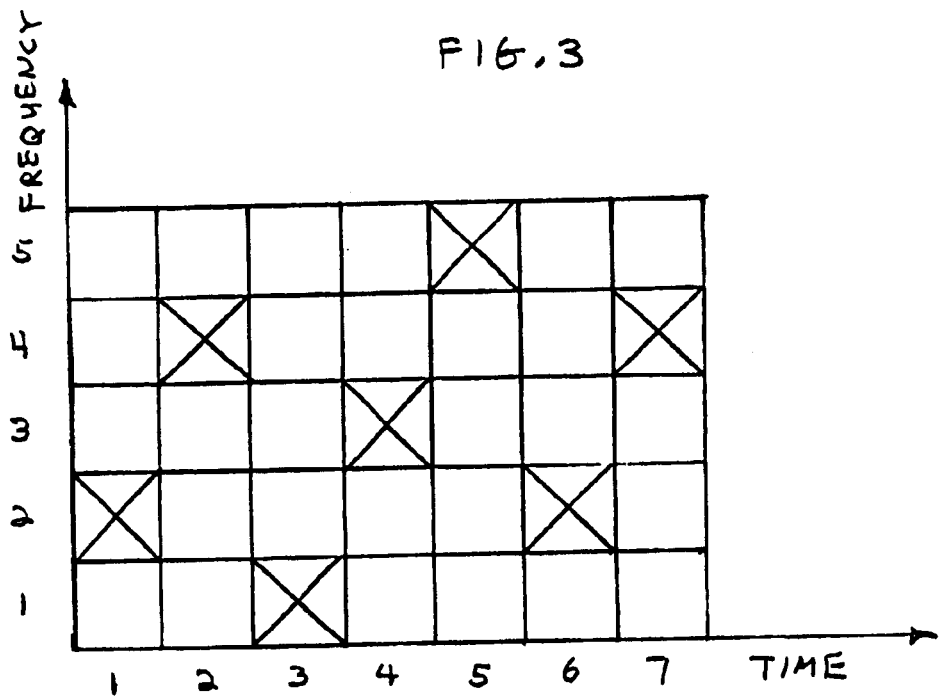
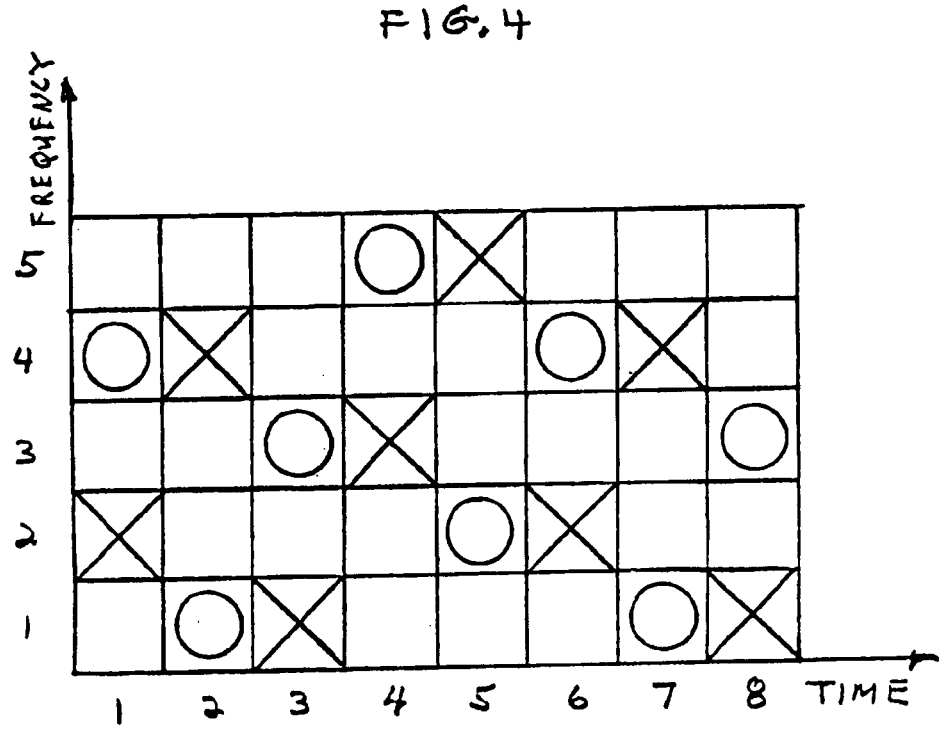

PILOT USE IN ORTHOGONAL FREQUENCY DIVISION MULTIPLEXING BASED SPREAD SPECTRUM MULTIPLE ACCESS SYSTEMS

RELATED APPLICATION

The present application is related to U.S. patent application Ser. No. 09/551,078 which was filed on Apr. 18, 2000.

TECHNICAL FIELD

This invention relates to communications systems and, more particularly, to orthogonal frequency division multiplexing (OFDM) based spread spectrum multiple access (SSMA) systems.

BACKGROUND OF THE INVENTION

It is important that wireless communications systems be such as to maximize the number of users that can be adequately served and to maximize data transmission rates, if data services are provided. Wireless communications systems are typically shared media systems, i.e., there is a fixed available bandwidth that is shared by all users of the wireless system. Such wireless communications systems are often implemented as so-called "cellular" communications systems, in which the territory being covered is divided into separate cells, and each cell is served by a base station.

It is well known in the art that desirable features of cellular wireless communications systems are that intracell interference be as small as possible and that intercell interference be averaged across all users in adjacent cells.

In such systems, it is important that mobile user units are readily able to identify and synchronize to the downlink of a base station transmitting the strongest signal. Prior arrangements have transmitted training symbols periodically for mobile user units to detect and synchronize to the associated base station downlink. In such arrangements, there is a large probability that the training symbols transmitted from different base stations would interfere with each other. Indeed, it is known that once the training symbols interfere with each other they will continue to interfere. Thus, if the training symbols are corrupted, then the data is also corrupted, thereby causing loss in efficiency. Pilots that are randomly placed in the time-frequency grid might not solve this problem too.

SUMMARY OF THE INVENTION

Problems and/or limitations of prior base station identification and downlink synchronization arrangements are addressed by employing pilot signals including known symbols transmitted at prescribed frequency tones in individual ones of prescribed time intervals. Specifically, the symbols used in the pilots are uniquely located in a time-frequency grid, i.e., plane, where the locations are specified by periodic pilot tone hopping sequences.

In a specific embodiment of the invention, a period of a pilot tone hopping sequence is constructed by starting with a Latin-square based hopping sequence, truncating it over time, and optionally offsetting and permuting it over frequency. Particular examples of pilot tone hopping sequences are parallel slope hopping sequences in which the periodicity of the sequences is chosen to be a prime number of symbol time intervals.

In another embodiment of the invention, a notion of phantom pilots is employed to facilitate use of various system parameters while accommodating the above noted pilot tone hopping sequences. That is, based on system considerations, when the frequency range of the above generated pilot tone hopping sequences exceeds the available bandwidth of a particular system a problem results. This problem is overcome by truncating the pilot tone hopping sequences whenever the tone frequency exceeds the bandwidth, that is, designating these tones as phantom pilot tones and not transmitting them.

BRIEF DESCRIPTION OF THE DRAWING

FIG. 3 is a graphical representation of a time-frequency grid including a pilot tone hopping sequence;

FIG. 4 is another graphical representation of a time-frequency grid including other pilot tone hopping sequences;

DETAILED DESCRIPTION

Figure 1:
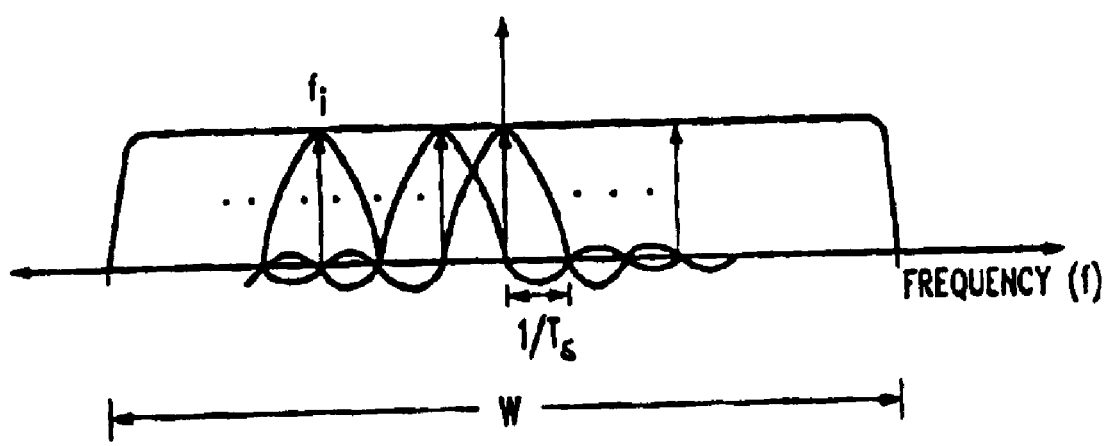
FIG. 1 illustrates a frequency domain representation in which a prescribed plurality of tones is generated in a prescribed bandwidth.

FIG. 1 illustrates a frequency domain representation in which a prescribed plurality of tones is generated in a prescribed bandwidth. In this example, bandwidth W is employed to generate a total of N, tones, i.e., $i=1, \ldots N_t$. The tones are spaced at $\Delta f=1/T_s$ apart, where $T_s$ is the duration of an OFDM symbol. Note that the tones employed in this embodiment of the invention are generated differently than those generated for a narrow band system. Specifically, in a narrow band system the energy from each tone is strictly confined to a narrow bandwidth centered around the tone frequency, whereas in an Orthogonal Frequency Division Multiplexing (OFDM) system that is a wide band system the energy at a particular tone is allowed to leak into the entire bandwidth W, but it is so arranged that the tones do not interfere with one another.

Figure 2:
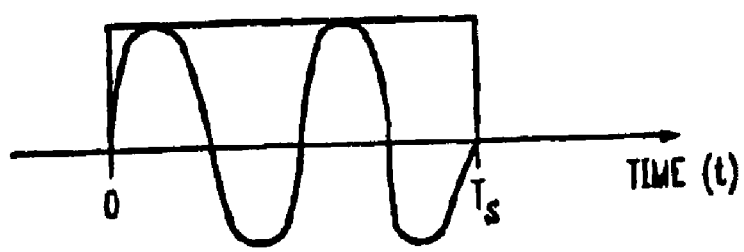
FIG. 2 illustrates a time domain representation of a tone $f_i$.

FIG. 2 illustrates a time domain representation of tone $f_i$ within symbol period $T_s$. Again, note that within each symbol period $T_s$, data may be transmitted on each of the tones substantially simultaneously.

FIG. 3 is a graphical representation of a time-frequency grid, i.e., plane, including a pilot tone hopping sequence. In general, a pilot tone includes known waveforms that are transmitted from a base station so that mobile receivers can estimate various parameters, for example, channel coefficients. In an Orthogonal Frequency Division Multiplexing based Spread Spectrum Multiple Access (OFDM-SSMA) system, in accordance with an aspect of the invention, the pilots include known symbols transmitted at prescribed frequencies and prescribed time instances. Indeed, OFDM systems employ orthogonal tones within a prescribed frequency bandwidth to transmit data to a plurality of users at the same time. Example pilot tones are shown in the lined regions of the time-frequency grid in FIG. 3. As shown, the pilots, i.e., tones, are located in the time-frequency grid in a parallel slope pilot tone hopping sequence. The use of pilot tones in the parallel slope pilot tone hopping sequence reduces the search effort of mobile user units in the process of base station identification and downlink synchronization. In the example shown in FIG. 3 there is one pilot tone hopping sequence having a prescribed slope "a"=2, and the periodicity of this sequence is five (5) symbol intervals, i.e., T=5. Therefore, in this example, during each symbol interval, a distinct pilot tone is employed, and over one sequence period of T symbols, p distinct pilot tones are employed. In this example we have p=T, but in general this is not necessary. The tones are numbered along the frequency axis and the symbol intervals, i.e., periods, are numbered along the time axis of FIG. 3. Thus, as shown, during: symbol interval (1), pilot tone (2) is transmitted; symbol interval (2), pilot tone (4) is transmitted; symbol interval (3), pilot tone (1) is transmitted; symbol interval (4), pilot tone (3), is transmitted; and during symbol interval (5), pilot tone (5) is transmitted. Thereafter, the pilot tone hopping sequence is repeated.

In summary, if the spacing between tones in FIG. 3 is $\Delta f$ then:

tone 1 corresponds to f;
tone 2 corresponds to f+$\Delta f$;
tone 3 corresponds to f+2$\Delta f$;
tone 4 corresponds to f+3$\Delta f$,
tone 5 corresponds to f+4$\Delta f$.
Similarly, if the duration of a symbol interval is $T_s$ then:
time 1 corresponds to $t_0$;
time 2 corresponds to $t_0+T_s$;
time 3 corresponds to $t_0+2T_s$;
time 4 corresponds to $t_0+3T_s$;
time 5 corresponds to $t_0+4T_s$;
time 6 corresponds to $t_0+5T_s$;
time 7 corresponds to $t_0+6T_s$.

FIG. 4 is another graphical representation of a time-frequency grid including other pilot tone hopping sequences. In the example shown in FIG. 4 there are two pilot tone hopping sequences represented by "X" and "O". Each of the pilot tone hopping sequences shown in the example of FIG. 4, has a prescribed slope "a" and a periodicity of five (5) symbol intervals, i.e., T=5. Therefore, in this example, during each symbol interval, two distinct pilot tones are employed, and over one sequence period of T symbols, p distinct pilot tones are employed for each of the two pilot tone hopping sequences. In this example we have p=T. The tones are numbered along the frequency axis and the symbol intervals, i.e., periods, are numbered along the time axis of FIG. 4. Thus, as shown, during: symbol interval (1), pilot tones (2) and (4) are transmitted; symbol interval (2), pilot tones (1) and (4) are transmitted; symbol interval (3), pilot tones (1) and (3) are transmitted; symbol interval (4), pilot tones (3) and (5) are transmitted; and during symbol interval (5), pilot tones (2) and (5) are transmitted. Thereafter, the pilot tone hopping sequences are repeated.

Figure 5:
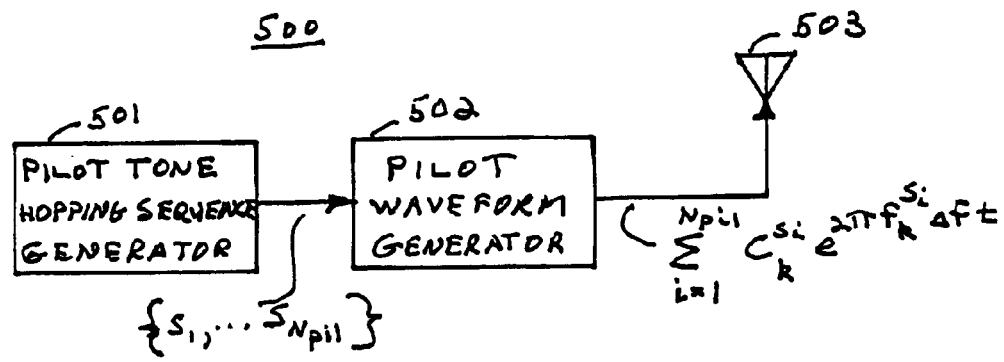
FIG. 5 shows, in simplified block diagram form, details of a transmitter including an embodiment of the invention.

FIG. 5 shows, in simplified block diagram form, details of a transmitter including an embodiment of the invention. Specifically, shown are pilot tone hopping sequence generator 501 and pilot waveform generator 502. Pilot tone hopping sequence generator 501 generates pilot sequences that specify tones to be used by the pilot at any time instant. Note that each cell uses $N_{pil}$ pilot sequences. The pilot sequence is defined as $S_1=\{f_0^{S_i}, f_1^{S_i}, \ldots f_k^{S_i}, \ldots\}$, for i=1, ... $N_{pil}$. The pilot sequence is supplied to pilot waveform generator 502 that generates, in this example, a waveform represented by $$\sum_{i=1}^{N_{pil}} C_k^{S_i} e^{2\pi f_k^{S_i} \Delta f t}$$

that, in turn, is supplied to antenna 503 for transmission after modulating a carrier frequency. Note that $\Delta f$ is the basic frequency spacing between adjacent tones, $C_k^{S_i}$ is a known symbol to be transmitted at the $k^{th}$ symbol instant and tone $f_k^{S_i}$.

In this example, a Latin Square based pilot hopping tone sequence is generated by $f_k^{S_i}=Z\{(a(k \bmod T)+s_i) \bmod p+d\}$, where "k" is a time instant index, "T", "a", "$s_i$" and "d" are integer constants, "p" is a prime constant, "Z" is a permutation operator defined on [MIN (0, d), MAX (N, -1, p-1+d)] and "$N_t$" is the total number of tones in the system. The parameter "T" is periodicity in time of the pilot tone hopping sequence. The parameter "d" is chosen such that $0 \leq d \leq N_t-p$. This choice of "d" ensures that the pilot tone hopping sequence lies within the transmission bandwidth.

Figure 8:
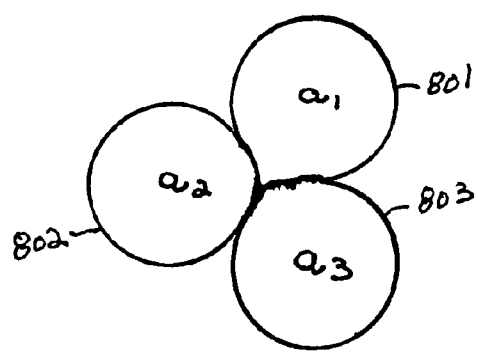
FIG. 8 illustrates a multicell environment in which the invention may advantageously be employed.

Further note that in this example, "p" is a prime number, is constant for all cells in the system, and is close to $N_t$. Also in this example, "Z" is an identity mapping. That is, any tone is mapped to itself, i.e., Z{f}=f. This particular choice for Z simplifies mobile unit receiver processes for synchronization and identification of the pilot of a base station, and improves the quality of channel estimation. Additionally, a small deviation from the identity mapping by appropriately defining Z may preserve some of the above salient features. However, such an arrangement is still covered by the general expression of permutation operator Z noted above. Moreover, Z is the same for all cells. The choice of T=p ensures that a period of the tone hopping sequence is the same as a Latin square hopping sequence and in combination with the choice of Z as an identity mapping results in the generation of the parallel slope tone hopping sequences. Other choices of T that are close to p would result in slight deviations from parallel slope tone hopping sequences. Parameter "a", i.e., the pilot hopping sequence slope, varies from cell to cell. This is illustrated in FIG. 8 below in an example including three (3) cells having parameters, i.e., slopes, $a_1$, $a_2$ and $a_3$, respectively. $N_{pil}$, $\{S_1, \ldots S_{Npil}\}$, is such as to provide a sufficient number of pilot tones for channel estimation. $N_{pil}$ is the same for all cells. Finally, $\{S_1, \ldots S_{Npil}\}$ is such as to enable the pilot functionalities, such as, channel estimation, base station identification and frame synchronization.

As alluded to above, use of pilot tones serves several roles in cellular communication systems. For example, they are employed to identify a new base station and the one having the strongest transmission signal, synchronize in both time and frequency to the strongest transmitting base station, and facilitates downlink channel estimation. By using above formula for $f_k^{S_i}$ with T=p the maximum number of collisions of the pilot tone hopping sequences of two neighboring base stations is minimized. Moreover, by choosing Z to be an identity mapping, the pilots generated are several parallel slope pilot tone hopping sequences, as shown in FIG. 4. The use of so-called slope pilots reduces the search effort in the process of base station identification and downlink synchronization. The value of the slope, the spacing between the parallel slopes and the number of pilot tone hopping sequences are determined based on a variety of considerations including channel estimation and base station identification. The physical layer frame size is chosen to be one period of the pilot tone hopping sequence. This facilitates tracking of so-called physical layer frames. Furthermore, a very uniform distribution of the pilot symbols is realized in that there is a fixed number transmitted in every symbol time and the pilot sequences are readily computable at a mobile unit receiver. In another embodiment of the invention, the notion of phantom pilots is employed to facilitate use of various system parameters while accommodating the above design of pilot tone hopping sequences. That is, based on system considerations, the frequency range of the pilot tone hopping sequences noted above exceeds the available bandwidth of a particular system, which would be a problem. This problem is overcome by truncating the pilot tone hopping sequences whenever the tone frequency exceeds the bandwidth, that is, designating these tones as phantom pilot tones and not transmitting them.

The concept of phantom tones facilitates a flexible choice for various system design parameters while accommodating the above design of pilot tone hopping sequences. The number of tones into which a certain bandwidth can be divided into depends on parameters of the system, such as, the data rate to be supported on each individual tone and the length of a cyclic prefix that is required to be used to ensure orthogonality in a multipath environment. Based on such considerations, an $N_t$ that is smaller than p may be arrived at for the system, which is a problem. The problem being that the pilot tone hopping sequence generated sometimes exceeds the allowable bandwidth. For certain choices of d this problem exists even if $N_t$ is greater than or equal top. This problem is resolved by employing the notion of phantom tones. That is, a prime number "p" is selected that is larger than $N_t$. Then, the pilot tone hopping sequences are generated using p by assuming that we have a bandwidth of p tones. (p–$N_t$) of these tones are called phantom tones. These tones are called phantom tones because they are not transmitted. The number of pilot tone hopping sequences is chosen to ensure that the channel estimation requirements are satisfied in spite of the phantom tones that are not transmitted. Indeed, the use of phantom tones has minimal adverse impact on the base station identification and synchronization processes.

Figure 6:
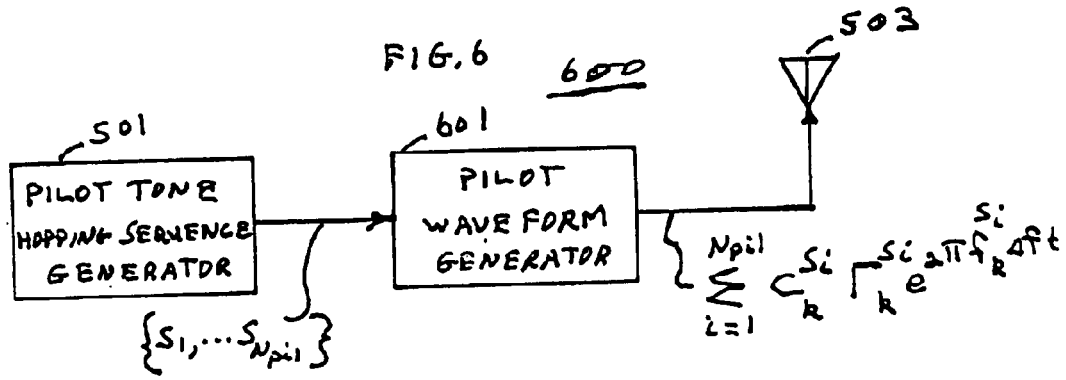
FIG. 6 shows, in simplified block diagram form, details of a transmitter including another embodiment of the invention.

FIG. 6 shows, in simplified block diagram form, details of a transmitter that employs phantom tones in accordance with another embodiment of the invention. The elements in FIG. 6 that are essentially identical to those shown in FIG. 5 have been similarly numbered and are not described again in detail. The difference between the transmitter 500 of FIG. 5 and transmitter 600 of FIG. 6 is that so-called phantom pilot tones generated by sequence generator 501 are not included in the waveform generated by pilot waveform generator 601. Thus, waveform generator 601 during the $k^{th}$ symbol instant, provides the waveform $$\sum_{i=1}^{N_{pil}} C_k^{S_i} \Gamma_k^{S_i} e^{2\pi f_k^{S_i} \Delta f i},$$

where, as above, $\Delta f$ is the basic frequency spacing between adjacent tones, $C_k^{S_i}$ is a known symbol to be transmitted at the $k^{th}$ symbol instant and tone $f_k^{S_i}$ and $\Gamma_k^{S_i}$=1, if $f_k^{S_i} \Sigma$[0, $N_t$–1], and $\Gamma_k^{S_i}$=0, otherwise.

Figure 7:
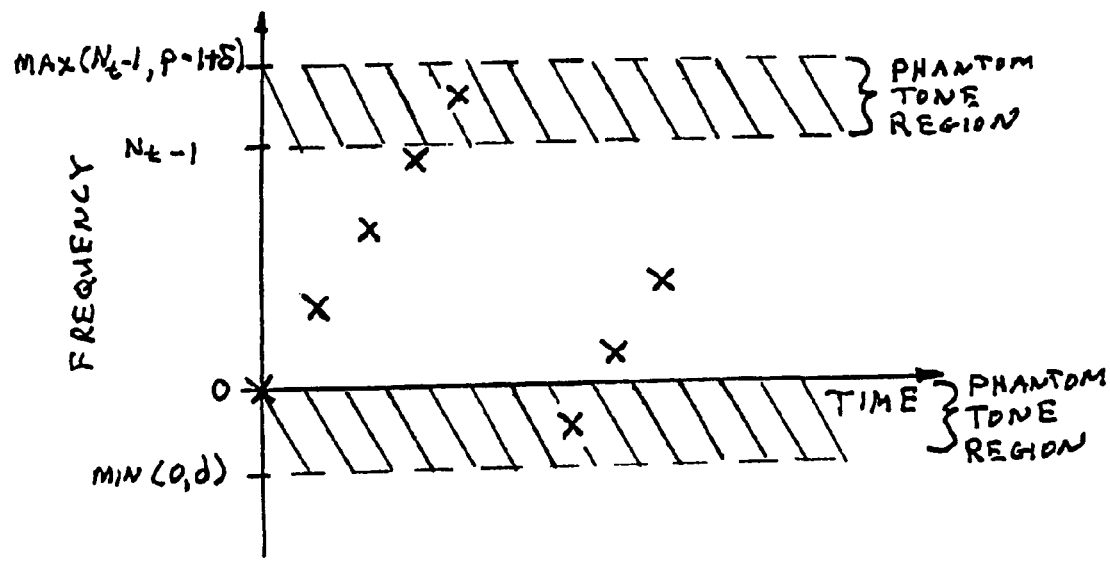
FIG. 7 is another graphical representation of a time-frequency grid illustrating phantom tone regions.

FIG. 7 is another graphical representation of a time-frequency grid illustrating phantom tone regions. As shown in FIG. 7, pilot tones generated by pilot tone sequence generator 501 are not transmitted if they fall within the phantom tone regions, namely, [MIN (0, d), 0] and [$N_t$–1, MAX ($N_t$–1, p–1+d)].

FIG. 8 illustrates a multicell environment in which the invention may advantageously be employed. Thus, shown are neighboring cells 801, 802 and 803 each having a pilot tone hopping sequence slope associated with it, namely, slopes $a_1$, $a_2$ and $a_3$, respectively. The slopes $a_1$, $a_2$ and $a_3$ are each unique to their associated cell 801, 802 and 803, respectively. It should be understood, however, that some distant cell may employ a slope such as either $a_1$, $a_2$ or $a_3$ so long as the particular remote cell does not interfere with the local cell employing the same slope for the pilot tone hopping sequence.

A mobile user unit, i.e., cell phone or the like, that may utilize the pilot tone hopping sequence arrangement of this invention to identify a base station is described in U.S. patent application Ser. No. 09/551,078, filed concurrently herewith and assigned to the assignee of this application.

The above-described embodiments are, of course, merely illustrative of the principles of the invention. Indeed, numerous other methods or apparatus may be devices by those skilled in the art without departing from the spirit and scope of the invention.

What is claimed is:

1. Apparatus for use in a base station in an orthogonal frequency division multiplexing (OFDM) based spread spectrum multiple access wireless system comprising:

a sequence generator for generating one or more pilot tone hopping sequences each including pilot tones, said pilot tones each being generated at frequency and time instants in a time-frequency grid;

a waveform generator, responsive to said one or more pilot tone hopping sequences, for generating a waveform for transmission;

wherein said sequence generator generates each of said one or more pilot tone hopping sequences in accordance with $S_i=\{f_0^{S_i}, f_1^{S_i}, \ldots f_k^{S_i}, \ldots\}$, for i=1, ... $N_{pil}$; and wherein $f_k^{S_i}=Z\{(a(k \bmod T)+s_i) \bmod p+d\}$, where "k" is a time instant index, "T", "a", "$S_i$" and "d" are integer constants, "p" is a prime constant, and "Z" is a permutation operator.

2. The invention as defined in claim 1 wherein said prescribed number of symbol intervals T is a prime number.

3. The invention as defined in claim 1 wherein each of said one or more pilot tone hopping sequences generated includes a prime number of distinct tones.

4. The invention as defined in claim 1 wherein said permutation operator Z is defined on [MIN (0, d), MAX (N, –1, p–1+d)] and "N," is the total number of tones in the system, p is a prime number of tones and "d" is a frequency.

5. The invention as defined in claim 1 wherein each of said one or more pilot tone hopping sequences has a slope "a".

6. The invention as defined in claim 5 wherein said slope "a" is unique to said base station among one or more neighboring base stations.

7. The invention as defined in claim 1 wherein said pilot tone hopping sequence generated by said sequence generator is a truncated Latin Square based hopping sequence.

8. Apparatus for use in a base station in an orthogonal frequency division multiplexing (OFDM) based spread spectrum multiple access wireless system comprising:

a sequence generator for generating one or more pilot tone hopping sequences each including pilot tones, said pilot tones each being generated at frequency and time instants in a time-frequency grid;

a waveform generator, responsive to said one or more pilot tone hopping sequences, for generating a waveform for transmission; and wherein said waveform generator generates a waveform in accordance with $$\sum_{i=1}^{N_{pil}} C_k^{S_i} e^{2\pi f_k^{S_i} \Delta f_i},$$

where $f_k^{S_i}$ are given by the sequence $S_i = \{f_i^{s_i}, f_i^{S_i}, \ldots\}$ for $i=1, \ldots N_{pil}$. $\Delta f$ is the basic frequency spacing between adjacent tones, $C_k^{S_i}$ is a known symbol to be transmitted at the $k^{th}$ symbol instant and tone $f_k^{S_i}$.

9. The invention as defined in claim 8 wherein $f_k^{S_i} = Z\{(a(k \bmod T) + s_i) \bmod p+d\}$, where "k" is a time instant index, "T", "a", "$s_i$" and "d" are integer constants, "p" is a prime constant, and "Z" is a permutation operator.

10. Apparatus for use in a base station in an orthogonal frequency division multiplexing (OFDM) based spread spectrum multiple access wireless system comprising:
   a sequence generator for generating one or more pilot tone hopping sequences each including pilot tones, said pilot tones each being generated at frequency and time instants in a time-frequency grid; and
   a waveform generator, responsive to said one or more pilot tone hopping sequences, for generating a waveform for transmission,
   wherein said waveform generator generates a waveform in accordance with $$\sum_{i=1}^{N_{pil}} C_k^{S_i} \Gamma_k^{S_i} e^{2\pi f_k^{S_i} \Delta f_i},$$

where $f_k^{S_i}$ are given by the sequence $S_i = \{f_i^{s_i}, f_i^{S_i}, \ldots\}$ for $i=1, \ldots N_{pil}$, $\Delta f$ is the basic frequency spacing between adjacent tones, $C_k^{S_i}$, is a known symbol to be transmitted at the $k^{th}$ symbol instant and tone $f_k^{S_i}$, and $\epsilon_k^{S_i}$, if $f_k^{S_i} \epsilon [0, N, -1]$, and $\Gamma_k^{S_i} = 0$, otherwise.

11. The invention as defined in claim 10 wherein $f_k^{S_i} = Z\{(a(k \bmod T) + s_i) \bmod p+d\}$, where "k" is a time instant index, "T", "a", "$s_i$" and "d" are integer constants, "p" is a prime constant, and "Z" is a permutation operator.

12. The invention as defined in claim 11 wherein said waveform generator includes a transmitter for transmitting said pilot tones and wherein pilot tones in phantom tone regions defined by [MIN (0, d), 0] and [$N_t - 1$, MAX ($N_t - 1$, p−1+d)], where "$N_t$" is the total number of tones in the system, p is a prime number of tones and "d" is a prescribed frequency, are not transmitted.

13. A method for use in a base station in an orthogonal frequency division multiplexing (OFDM) based spread spectrum multiple access wireless system comprising the steps of:
   generating one or more pilot tone hopping sequences each including pilot tones, said pilot tones each being generated at frequency and time instants in a time-frequency grid;
   in response to said one or more pilot tone hopping sequences, generating a waveform for transmission; and
   wherein said step of generating one or more pilot tone hopping sequences includes a step of generating each of said one or more pilot tone hopping sequences in accordance with $S_i = \{f_i^{s_i}, f_i^{S_i}, \ldots\}$ for $i=1, \ldots N_{pil}$, and wherein $f_k^{S_i} = Z\{(a(k \bmod T) + s_i) \bmod p+d\}$, where "k" is a time instant index, "T", "a", "$s_i$" and "d" are integer constants, "p" is a prime constant, and "Z" is a permutation operator.

14. The method as defined in claim 13 wherein said prescribed number of symbol intervals T is a prime number.

15. The method as defined in claim 13 wherein said step of generating one or more pilot tone hopping sequences includes a step of generating each of said one or more pilot tone hopping sequences having a prime number of distinct tones.

16. The method as defined in claim 13 wherein said permutation operator Z is defined on [MIN (0, d), MAX ($N_t - 1$, p−1+d)] and "$N_t$" is the total number of tones in the system, p is a prime number of tones and "d" is a frequency.

17. The method as defined in claim 13 wherein said step of generating one or more pilot tone hopping sequences includes a step of generating each of said one or more pilot tone hopping sequences having a slope "a".

18. The method as defined in claim 17 wherein said slope "a" is unique to said base station among one or more neighboring base stations.

19. A method for use in a base station in an orthogonal frequency division multiplexing (OFDM) based spread spectrum multiple access wireless system comprising the steps of:
   generating one or more pilot tone hopping sequences each including pilot tones, said pilot tones each being generated at frequency and time instants in a time-frequency grid;
   in response to said one or more pilot tone hopping sequences, generating a waveform for transmission, and wherein said step of generating said waveform includes a step of generating said waveform in accordance with $$\sum_{i=1}^{N_{pil}} C_k^{S_i} e^{2\pi f_k^{S_i} \Delta f_i},$$

where $f_k^{S_i}$ are given by the sequence $S_i = \{f_i^{s_i}, f_i^{S_i}, \ldots\}$ for $i=1, \ldots N_{pil}$, where $\Delta f$ is the basic frequency spacing between adjacent tones, $C_k^{S_i}$ is a known symbol to be transmitted at the $k^{th}$ symbol instant and tone $f_k^{S_i}$.

20. The method as defined in claim 19 wherein $f_k^{S_i} = Z\{(a(k \bmod T) + s_i) \bmod p+d\}$, where "k" is a time instant index, "T", "a", "s", and "d", are integer constants, "p" is a prime constant, and "Z" is a permutation operator.

21. A method for use in a base station in an orthogonal frequency division multiplexing (OFDM) based spread spectrum multiple access wireless system comprising the steps of:
   generating one or more pilot tone hopping sequences each including pilot tones, said pilot tones each being generated at frequency and time instants in a time-frequency grid;
   in response to said one or more pilot tone hopping sequences, generating a waveform for transmission; and
   wherein said step of generating said waveform includes a step of generating-said waveform in accordance with $$\sum_{i=1}^{N_{pil}} C_k^{S_i} \Gamma_k^{S_i} e^{2\pi f_k^{S_i} \Delta f_i},$$

where $f_k^{S_i}$ are given by the sequence $S_i = \{f_i^{s_i}, f_i^{S_i}, \ldots\}$ for $i=1, \ldots N_{pil}$, where $\Delta f$ is the basic frequency spacing between adjacent tones, $C_k^{S_i}$ is a known symbol to be transmitted at the $k^{th}$ symbol instant and tone $f_k^{S_i}$ and $\Gamma_k^{S_i}=1$, if $f_k^{S_i} \in [0, N_t-1]$, and $\Gamma_k^{S_i}=0$, otherwise.

22. The method as defined in claim 21 wherein $f_k^{S_i}=Z\{(a(k \bmod T)+s_i) \bmod p + d\}$, where "k" is a time instant index, "T", "a", "$s_i$," and "d" are integer constants, "p" is a prime constant, and "Z" is a permutation operator.

23. The method as defined in claim 22 further including a step of transmitting said pilot tones and wherein pilot tones in phantom tone regions defined by [MIN (0, d), 0] and [$N_t-1$, MAX ($N_t-1$, p−1+d)], where "$N_t$" is the total number of tones in the system, p is a prime number of tones and "d" is a prescribed frequency are not transmitted.

24. Apparatus for use in a base station in an orthogonal frequency division multiplexing (OFDM) based spread spectrum multiple access wireless system comprising:

means for generating one or more pilot tone hopping sequences each including pilot tones, said pilot tones each being generated at frequency and time instants in a time-frequency grid; and means, responsive to said one or more pilot tone hopping sequences, for generating a waveform for transmission, wherein said step of generating one or more pilot tone hopping sequences includes a step of generating each of said one or more pilot tone hopping sequences in accordance with $S_i = \{f_i^{s_i}, f_i^{S_i}, \ldots\}$ for i=1, ... $N_{pil}$, and wherein $f_k^{S_i} = Z\{(a(k \bmod T) + s_i) \bmod p + d\}$, where "k" is a time instant index, "T", "a", "$s_i$" and "d" are integer constants, "p" is a prime constant, and "Z" is a permutation operator.

25. The invention as defined in claim 24 wherein said prescribed number of symbol intervals T is a prime number.

26. The invention as defined in claim 24 wherein said means for generating one or more pilot tone hopping sequences includes means for generating each of said one or more pilot tone hopping sequences having a prime number of distinct tones.

27. The invention as defined in claim 24 wherein said permutation operator z is defined on [MIN (0, d), MAX ($N_t-1$, p−1−d)] and "$N_t$" is the total number of tones in the system, p is a prime number of tones and "d" is a prescribed frequency.

28. The invention as defined in claim 24 wherein said means for generating one or more pilot tone hopping sequences includes means for generating each of said one or more pilot tone hopping sequences having a slope "a".

29. The invention as defined in claim 28 wherein said slope "a", is unique to said base station among one or more neighboring base stations.

30. Apparatus for use in a base station in an orthogonal frequency division multiplexing (OFDM) based spread spectrum multiple access wireless system comprising:

means for generating one or more pilot tone hopping sequences each including pilot tones, said pilot tones each being generated at frequency and time instants in a time-frequency grid;

means, responsive to said one or more pilot tone hopping sequences, for generating a waveform for transmission; and wherein said means for generating said waveform includes means for generating said waveform in accordance with $$\sum_{i=1}^{N_{pil}} C_k^{S_i} e^{2\pi f_k^{S_i} \Delta f i},$$

where $f_k^{S_i}$ are given by the sequence $S_i = \{f_i^{s_i}, f_i^{S_i}, \ldots\}$ for i=1, ... $N_{pil}$, where $\Delta f$ is the basic frequency spacing between adjacent tones, $C_k^{S_i}$ is a known symbol to be transmitted at the $k^{th}$ symbol instant and tone $f_k^{S_i}$.

31. The invention as defined in claim 30 wherein $f_k^{S_i}=Z\{(a(k \bmod T)+s_i) \bmod p+d\}$, where "k" is a time instant index, "T", "a", "$s_i$" and "d" are integer constants, "p" is a prime constant, and "Z" is a permutation operator.

32. Apparatus for use in a base station in an orthogonal frequency division multiplexing (OFDM) based spread spectrum multiple access wireless system comprising:

means for generating one or more pilot tone hopping sequences each including pilot tones, said pilot tones each being generated at frequency and time instants in a time-frequency grid;

means, responsive to said one or more pilot tone hopping sequences, for generating a waveform for transmission; and wherein said means for generating said waveform includes means for generating said waveform in accordance with $$\sum_{i=1}^{N_{pil}} C_k^{S_i} \Gamma_k^{S_i} e^{2\pi f_k^{S_i} \Delta f i},$$

where $f_k^{S_i}$ are given by the sequence $S_i = \{f_i^{s_i}, f_i^{S_i}, \ldots\}$ for i=1, ... $N_{pil}$, where $\Delta f$ is the basic frequency spacing between adjacent tones, $C_k^{S_i}$ is a known symbol to be transmitted at the $k^{th}$ symbol instant and tone $f_k^{S_i}$ and $\Gamma_k^{S_i}=1$, if $f_k^{S_i} \in [0, N_t-1]$, and $\Gamma_k^{S_i}=0$, otherwise.

33. The invention as defined in claim 32 wherein $f_k^{S_i}=Z\{(a(k \bmod T)+s_i) \bmod p+d\}$, where {k} is a time instant index, "T", "a", "$s_i$," and "d" are integer constants, "p" is a prime constant, and "Z" is a permutation operator.

34. The invention as defined in claim 33 further including means for transmitting said pilot tones and wherein pilot tones in phantom tone regions defined by [MIN (0, d), 0] and [$N_t-1$, MAX ($N_t-1$, p−1+d)], where "$N_t$" is the total number of tones in the system, p is a prime number of tones and "d" is a prescribed frequency are not transmitted.

* * * * *